United States Patent [19]

Daff et al.

[11] Patent Number: 5,308,425
[45] Date of Patent: May 3, 1994

[54] METHOD OF MAKING CROSSLINKED ACRYLIC SHEET WITH ENHANCED VACUUM MOLDING ATTRIBUTES

[75] Inventors: Richard A. Daff, Erlanger; James D. Leaseburge, Villa Hills, both of Ky.

[73] Assignee: Aristech Chemical Corporation, Pittsburgh, Pa.

[21] Appl. No.: 964,999

[22] Filed: Oct. 22, 1992

[51] Int. Cl.$^5$ .................... B32B 31/00; B29C 39/20
[52] U.S. Cl. ..................... 156/231; 156/238; 156/242; 156/243; 156/244.11; 156/246; 264/212; 264/213; 264/216; 264/217; 264/218
[58] Field of Search ............ 156/231, 238, 242, 243, 156/246, 244.11, 310, 313; 264/212, 213, 216, 217, 218; 4/538, 584, DIG. 9

[56] References Cited

U.S. PATENT DOCUMENTS

| | | |
|---|---|---|
| 3,371,383 | 3/1968 | Hellsund .................... 18/26 |
| 3,376,371 | 4/1968 | Opel et al. .................. 264/216 |
| 4,162,343 | 7/1979 | Wilcox et al. ............. 156/244.11 |
| 4,214,030 | 7/1980 | Rakes et al. ............... 156/246 |
| 4,803,026 | 2/1989 | Ikeda et al. ............... 264/216 |
| 4,822,652 | 4/1989 | Sempio et al. ............. 264/46.8 |
| 4,844,944 | 7/1989 | Graefe et al. ............. 4/538 |
| 4,892,700 | 1/1990 | Guerra et al. ............. 264/216 |
| 5,004,761 | 4/1991 | Yada et al. ............... 264/216 |
| 5,069,851 | 12/1991 | Hicks et al. ............... 264/171 |

FOREIGN PATENT DOCUMENTS 63-111050  5/1988  Japan .

*Primary Examiner*—Caleb Weston
*Attorney, Agent, or Firm*—William L. Krayer

[57] ABSTRACT

A protective film is placed on acrylic sheet. The film has a polyethylene side and an adherent EVA side; it will survive stressful lamination procedures as well as thermoforming, and can be easily removed from a finished article after thermoforming.

13 Claims, No Drawings

METHOD OF MAKING CROSSLINKED ACRYLIC SHEET WITH ENHANCED VACUUM MOLDING ATTRIBUTES

TECHNICAL FIELD

This invention relates to acrylic sheets and laminates which have improved vacuum thermoforming properties. The improved properties are imparted by the use of an outer layer of a thin film which has two surfaces—a polyolefin or other thermoplastic, and a surface of ethylene/vinyl acetate. The ethylene/vinyl acetate side of the film adheres lightly to the crosslinked acrylic surface. The described combinations of substrate and film can survive the thermal and physical stresses not only of the thermoforming process, but also of the preceding lamination process, so that the film can be left on the thermoformed product and used as a protective cover which can easily be removed at the point of ultimate use of the thermoformed product.

BACKGROUND OF THE INVENTION

Acrylic sheets are made in thicknesses of about 0.08 to about 0.500 inch and used in relatively small areas of about 5 ft.$^2$ and large area pieces of as much as 200 ft.$^2$. They are commonly thermoformed into large consumer and other products such as indoor and outdoor spas, tub/shower enclosures, skylights, bathtubs and highway signs. They may be used as monolithic polymethylmethacrylate sheets or as laminates of such acrylic sheets with other thermoplastics such as ABS. Prior to the present invention it has been known to place a protective film on the acrylic sheet prior to thermoforming, and to employ such film as a protective layer which is intended to be removed only after the thermoforming process. Some kinds of protective materials, such as those based on paper, are totally unsuitable for the thermoforming process since they cannot be stretched or conformed to the shape of a mold—thus, if they are used, they can be used to protect the sheet only up to a point prior to thermoforming, where they must be removed. Frequently new protective wrappings or coatings must be placed on the product after thermoforming. A prior commercial process and product we are familiar with employed a polyethylene film as a protective layer which ostensibly could be left on during thermoforming. But the polyethylene film was often extremely difficult to remove after thermoforming, and caused other problems such as pitting in the acrylic surface due to the generation of air bubbles under the film.

In the case of acrylic/ABS laminates such as are made by the method of U.S. Pat. No. 5,069,851 to Hicks et al and other laminates such as acrylic/PVC laminates, it has been difficult to place the film on the acrylic—a separate step must be included after lamination to do so, since the film will frequently not survive the lamination step.

We have also been made aware of Japanese Patent Application No. 61-257918, filed in Japan Oct. 29, 1986, published May 16, 1988, 63-111050, which describes a film to be left on an acrylic substrate during thermoforming. The film is a two-layer film of low-density polyethylene and ethylene/vinyl acetate which is 20 microns thick. Example 1 of this disclosure describes the application of the film to a two-layer sheet of "MMA/ABS" which is 2.5 mm thick, and the subsequent vacuum molding of it in "an equipment of the male die push-up type". The disclosure does not provide the meaning of "MMA" and does not mention the temperature range, if any heating is used. While it does mention that the "peeling off" of the film is easier after vacuum molding as compared to four other types of film, it does not give their thicknesses and other characteristics.

SUMMARY OF THE INVENTION

This invention is a new thermoformable sheet which includes an acrylic substrate of crosslinked acrylic, primarily polymethylmethacrylate, and an overlying film of coextruded low-density polyethylene and ethylene/vinyl acetate. The crosslinked acrylic substrate may in turn be laminated with other thermoplastic materials such as ABS or PVC. The invention also includes methods of making the sheet and methods of thermoforming it, as well as the thermoformed products made thereby.

The film we employ is a cast, coextruded film of low density polyethylene on one side and a blend of polyethylene and ethylene/vinyl acetate copolymer on the other. It ranges from about 2 to about 4.0 mils in thickness (1 mil=0.001 inch; therefore the film is about 5 to about 10 microns). The low density polyethylene layer is thicker than the polyethylene/polyvinyl acetate-ethylene copolymer layer—generally about 3:1 to about 7:1. The polyethylene may contain a small amount, usually about 5%, of a finely divided clay to inhibit adhesion when the film is formed into a roll. The ethylene/polyvinyl acetate material is a blend of polyethylene to polyethylene/vinyl acetate copolymer of about 10:1 to about 4:1, preferably about 12% EVA copolymer. The film is used in large rolls, so it is applied continuously to the acrylic sheet as the acrylic sheet is made.

The acrylic sheet substrate is cast continuously on large stainless steel belts of the type described in Hellsund U.S. Pat. No. 3,371,383 and Opel et al U.S. Pat. No. 3,376,371 in widths from about 24 inches to about 110 inches and thicknesses of about 0.080 to about 0.5 inch. The casting syrup typically includes from about 60% to about 95% methyl methacrylate and about 5% to about 40% polymerized methyl methacrylate dissolved in it to impart viscosity and to preempt the generation of heat during the cure. Significantly for present purposes, the formulation includes about 0.1% to about 0.3% crosslinking agent. If there is too much crosslinking agent, the material will be difficult to thermoform; if there is too little, it may have difficulty retaining a thermoformed shape. Suitable crosslinking agents include ethylene glycol dimethacrylate, polyethylene dimethacrylate, butane, hexane and/or higher dimethacrylate; any dimethacrylate having a linking group of up to ten carbon atoms will be satisfactory. Ideally for many purposes, about 10% to about 20% of the polymethylmethacrylate in the sheet is not crosslinked. Thus it is clear that our products are designed specifically for thermoforming. References herein to acrylic sheet are intended to include both opaque and clear forms; the prior art opaque sheets may have high pigment contents and perhaps other kinds of fillers, as is known in the art.

The film in an appropriate width for the cast acrylic is taken directly from a roll and placed on the acrylic while it is still on the casting belt, even while the acrylic may be at temperatures as high as 150°. Adherence to the acrylic is assisted by the application of a heated rubber roll. The product is thus a continuous cast sheet.

The sheet can then be cut into the desired lengths as in the prior art, or rolled into large rolls, also as is known. The more or less conventional crosslinked acrylic may be sent directly for thermoforming where it is formed into desired shapes in a known manner and the film is then simply peeled off, preferably at the time of ultimate installation. If the material is to be laminated with ABS, for example, it is sent to a laminating facility such as is described in the above-mentioned Hicks et al patent, and is able to withstand the heat and pressure applied in such a process. The resulting ABS/acrylic laminate has a peelable film on it which can further withstand the thermoforming process and still be peelable. The entire specification of the Hicks et al U.S. Pat. No. 5,069,851 is incorporated herein by reference.

DETAILED DESCRIPTION OF THE INVENTION

This invention will be illustrated in further detail by the following examples and comparative examples.

EXAMPLE 1 and COMPARATIVE EXAMPLES 1 and 2

To the acrylic surface of a continuous cast cross-linked polymethylmethacrylate sheet (0.125" thick), the vinyl acetate-ethylene copolymer side of a two-layer film of low density polyethylene/vinyl acetate-ethylene copolymer (0.0025" thick) was applied as a protective film to produce a vacuum-moldable sheet. This sheet was then subjected to infra-red heating to a surface temperature of 360° F., upon which time it was vacuum molded using equipment of the female die pull-down type.

For comparison purposes, the above procedure was repeated, wherein paper masking (comparative Example 1) and low-density polyethylene (0.0025" thick) (comparative Example 2) were applied to the acrylic surface, as a protective film. All other conditions remained substantially the same. The results of Example 1 and comparative Examples 1 and 2 were as shown in Table I.

EXAMPLE 2 and COMPARATIVE EXAMPLES 3 and 4

A continuous cast cross-linked polymethylmethacrylate sheet (1.125" thick) was manufactured, wherein three different protective films low-density polyethylene/vinyl acetate-ethylene copolymer (Example 2) paper masking (comparative Example 3), and low-density polyethylene (comparative Example 4) employed above were applied to the acrylic surface of the above-mentioned sheet. These three sheets, with their respective protective film applied, were then put through an extrusion process for the purpose of producing a composite material of acrylic and ABS. During this process, an ABS layer (0.125" thick) was applied to the bottom side of the above-mentioned sheets to produce a composite with a total thickness of 0.250" (0.125" acrylic/0.125" ABS). These sheets were then subjected to infra-red heating to a surface temperature of 390° F. upon which time they were vacuum molded using equipment of the male die pull-down type. The results of Example 2 and comparative Examples 3 and 4 were as shown in Table II.

TABLE I

| | Protective Film | Elongation in Molding | Air Entrapment | Peeling Before Molding | Peeling After Molding |
|---|---|---|---|---|---|
| Example 1 | Low-Density Polyethylene/EVA | Good | No | Good | Good |
| Comparative Example 1 | Paper Masking | No Stretch | No | — | — |
| Comparative Example 2 | Low-Density Polyethylene | Good | Yes | Fair | Poor |

TABLE II

| | Protective Film | Peeling Before Extrusion Process | Peeling After Extrusion Process | Peeling After Extrusion Process & Vacuum Molding |
|---|---|---|---|---|
| Example 2 | Low-Density Polyethylene/EVA | Good | Good | Good |
| Comparative Example 3 | Paper Masking | — | — | — |
| Comparative Example 4 | Low-Density Polyethylene | Fair | Poor | Poor |

We claim:

1. Method of continuously making an acrylic sheet having improved properties for thermoforming comprising continuously casting said sheet on a casting belt from a casting syrup comprising methyl methacrylate and about 5% to about 40% polymethylmethacrylate dissolved therein and containing about 0.1% to about 0.3% crosslinking agent based on the weight of the syrup, continuously curing said sheet while on said belt, and applying continuously to said sheet a film comprising a layer of polyethylene and a layer of a blend of polyethylene and a copolymer of ethylene and vinyl acetate, said film being applied to said acrylic sheet by the layer thereof which is made of said lend of polyethylene and a copolymer of ethylene and vinyl acetate.

2. Method of claim 1 wherein the crosslinking agent is a dimethacrylate.

3. Method of claim 1 wherein the acrylic sheet is about 0.08 to about 0.5 inch thick.

4. Method of claim 1 wherein said film is about 0.002 inch to about 0.004 inch thick.

5. Method of claim 1 wherein the thickness of the polyethylene layer of the film and the thickness of the blend layer of the film have a ratio of about 3:1 to about 7:1.

6. Method of claim 1 wherein the ratio of polyethylene to ethylene/vinyl acetate copolymer is the blend layer of the film is about 10:1 to about 4:1.

7. Method of making a laminate of acrylic and a different thermoplastic material, said laminate having improved thermoforming properties comprising continuously casting an acrylic sheet, continuously adhering thereto a film comprising a layer of polyethylene and a layer of copolymer of ethylene and vinyl acetate, by said layer of copolymer, and laminating to the side of said acrylic sheet without said film an extruded layer of a thermoplastic material different from acrylic.

8. Method of claim 7 wherein said acrylic is crosslinked.

9. Method of claim 7 wherein said different thermoplastic material is ABS.

10. Method of claim 7 wherein the lamination of said different thermoplastic material is accomplished by cofeeding said extruded layer of said different thermoplastic material and said acrylic sheet while at an elevated temperature into a roll stack.

11. Method of claim 7 wherein said film is about 0.002 to about 0.004 inch thick.

12. Method of claim 7 wherein the ratio of the thickness of the polyethylene layer of the film to the blend layer of the film is about 3:1 to about 7:1.

13. Method of claim 7 wherein the ratio of polyethylene to copolymer in said blend layer of said film is about 10:1 to about 4:1 by weight.

* * * * *

UNITED STATES PATENT AND TRADEMARK OFFICE
CERTIFICATE OF CORRECTION

PATENT NO.   :   5,308,425
DATED        :   May 3, 1994
INVENTOR(S)  :   Richard A. Daff and James D. Leaseburge It is certified that error appears in the above-identified patent and that said Letters Patent is hereby corrected as shown below:

Column 3, line 49, change "(1.125." thick)" to -- (.125" thick) --.

Column 4, line 58, claim 6, change "is" to -- in --.

Signed and Sealed this

Sixth Day of September, 1994

Attest:

BRUCE LEHMAN

*Attesting Officer*    *Commissioner of Patents and Trademarks*